US010295700B2

(12) United States Patent
Beekman et al.

(10) Patent No.: US 10,295,700 B2
(45) Date of Patent: May 21, 2019

(54) DOWNHOLE X-RAY RADIATION DETECTOR SYSTEMS AND METHODS

(71) Applicant: Schlumberger Technology Corporation, Sugar Land, TX (US)

(72) Inventors: Sicco Beekman, Houston, TX (US); Christian Stoller, Princeton Junction, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 179 days.

(21) Appl. No.: 15/393,793

(22) Filed: Dec. 29, 2016

(65) Prior Publication Data

US 2018/0188412 A1  Jul. 5, 2018

(51) Int. Cl.
*G01V 5/12* (2006.01)

(52) U.S. Cl.
CPC ...................... *G01V 5/12* (2013.01)

(58) Field of Classification Search
CPC .. G01V 5/125; G01V 5/08; G01V 5/04; H01J 47/026; G01T 3/008; G01T 1/2935
See application file for complete search history.

(56) References Cited

U.S. PATENT DOCUMENTS

| | | | |
|---|---|---|---|
| 6,069,362 A * | 5/2000 | Giakos | G01T 1/2935 250/324 |
| 7,507,952 B2 | 3/2009 | Groves et al. | |
| 7,542,543 B2 | 6/2009 | Shampine et al. | |
| 7,564,948 B2 | 7/2009 | Wraight et al. | |
| 7,639,781 B2 | 12/2009 | Shampine et al. | |
| 7,684,540 B2 | 3/2010 | Groves et al. | |
| 7,903,782 B2 | 3/2011 | Groves et al. | |

(Continued)

OTHER PUBLICATIONS

Notice of Allowance issued in related case U.S. Appl. No. 14/663,158 dated Jul. 13, 2018 (9 pages).

(Continued)

*Primary Examiner* — Courtney D Thomas
(74) *Attorney, Agent, or Firm* — Michael Dae

(57) ABSTRACT

A system for a downhole tool includes an X-ray generator that outputs X-ray radiation into a surrounding sub-surface formation using electrical power received from a power supply and a detector device adjacent the X-ray generator. The detector device includes a first detector with a first radiation sensitivity that outputs a first measurement signal based on interaction between a first portion of the X-ray radiation and the first detector. The detector device also includes a second detector with a second radiation sensitivity adjacent the first detector, where the second detector outputs a second measurement signal based on interaction between a second portion of the X-ray radiation and the second detector. Further, the detector device includes a control system communicatively coupled to the X-ray generator and the detector device, where the control system determines characteristics of the X-ray radiation output from the X-ray generator based at least in part on a radiation model that describes expected relationship between the characteristics of the X-ray radiation and doses indicated by the first measurement signal and the second measurement signal.

19 Claims, 8 Drawing Sheets

(56) References Cited

U.S. PATENT DOCUMENTS

| | | | |
|---|---|---|---|
| 7,960,687 B1* | 6/2011 | Simon | G01V 5/125 250/269.1 |
| 8,975,593 B1 | 3/2015 | Best et al. | |
| 2004/0248314 A1 | 12/2004 | Stephenson et al. | |
| 2005/0269499 A1 | 12/2005 | Jones et al. | |
| 2007/0287190 A1 | 12/2007 | Chevalier et al. | |
| 2008/0302533 A1 | 12/2008 | Richard et al. | |
| 2010/0147349 A1 | 6/2010 | DiFoggio | |
| 2012/0087467 A1 | 4/2012 | Tjugum | |
| 2012/0138782 A1 | 6/2012 | Simon et al. | |
| 2013/0329859 A1* | 12/2013 | Groves | G01T 1/20 378/88 |
| 2014/0060821 A1 | 3/2014 | Rodney et al. | |
| 2014/0117246 A1 | 5/2014 | Zhou et al. | |
| 2014/0208768 A1 | 7/2014 | Bacic | |
| 2015/0115992 A1 | 4/2015 | Fushie et al. | |
| 2015/0211350 A1 | 7/2015 | Norman et al. | |
| 2016/0274038 A1 | 9/2016 | Brady et al. | |
| 2016/0320520 A1 | 11/2016 | Hiles et al. | |
| 2017/0169909 A1 | 6/2017 | Tkabladze | |
| 2018/0188409 A1 | 7/2018 | Manclossi | |

OTHER PUBLICATIONS

Office Action issue in Related U.S. Appl. No. 15/393,805 dated Aug. 10, 2018, (31 pages).

Imashuku, S. et al, "Development of a Palm-Size Electron Probe X-Ray Analyzer", JCPDS—International Centre for Diffraction Data (2012) ISSN 1097-0002, pp. 252-256.

Geuther, J.A. et al., "High-Energy X-ray Production With Pyroelectric Crystals," Journal of Applied Physics 97, (2005), 5 pp.

Geuther J., et al, "Electron Acceleration for X-Ray Production Using Paired Pyroelectric Crystals," Rensselaer Polytechnic Institute, pp. 591-595.

Fukao, S., et al, "X-rays Source Using Thermal Excitation of Pyroelectric Crystal for Medical Application", Progress in Electromagnetics Research Symposium Proceedings, Moscow, Russia, Aug. 18-21, 2009, pp. 807-815.

Gall, B., et al, "Investigation of the Piezoelectric Effect as a Means to Generate X-Rays," IEEE Transactions on Plasma Science, vol. 41, No. 1, Jan. 2013, pp. 106-111.

Gall, B.B. et al, "High Voltage Piezoelectric System for Generating Neutrons", Digest of Technical Papers—IEEE International Pulsed Power Conference [1-4673-5167-9] (2013).

Sarrazin, P., et al, "Carbon-Nanotube Field Emission X-Ray Tube for Space Exploration XRD/XRF Instrument", International Centre for Diffraction Data (2004 Advances in X-ray Analysis, vol. 47, pp. 232-239.

Fitzgerald, et al, "Continuous Gamma-ray Densitometry in a Borehole Flow Meter," IEEE Nuclear Science Symposium Conference, vol. 2 (2003) Article No. N26-64, pp. 732-736.

Webster, et al, "Multiphase Well Surveillance with a Permanent Downhole Flowmeter," SPE90024, (2204) Society of Petroleum Engineers, 8 pp.

Amptek X-ray Generator with Pyroelectric Crystal, http://www.amptek.com/pdf/coolx.pdf, accessed Sep. 13, 2016, 4 pp.

International Search Report and Written Opinion issued in the related PCT Application No. PCT/US2016/020399 dated Jun. 10, 2016, (15 pages).

International Preliminary Report on Patentability issued in the related PCT Application No. PCT/US2016/020399 dated Sep. 19, 2017 (13 pages).

G.Bertuccio and R.Casiraghi, "Study of Silicon Carbide for X-Ray Detection and Spectroscopy", IEEE Transactions on Nuclear Science, vol. 50, No. 1, Feb. 2003, (11 pages).

G.Bertuccio, D.Puglisi et al. "Silicon Carbide Detectors for in vivo Dosimetry", IEEE Transactions on Nuclear Science, vol. 61, No. 2, Apr. 2014 (6 pages).

J.Russel Terry et al., Evaluation of COTS Silicon Carbide Photodiodes for a Radiation-Hard, Low-Energy X-Ray Spectrometer, 2011 IEEE Nuclear Science Symposium Conference Record, (4 pages).

S.P.Lansley et al. "CVD Diamond X-ray Detectors for Radiotherapy Dosimetry", S.P.Lansley et al., IEEE Sensors 2009 Conference (6 pages).

D.M.Trucchi et al., "Very Fast and Primingless Single-Crystal-Diamond X-Ray Dosimeters", IEEE Electron Device Letters, vol. 33, No. 4, Apr. 2012 (3 pages).

Office Action issue in Related U.S. Appl. No. 15/393,805 dated Feb. 13, 2019 (28 pages).

* cited by examiner

DOWNHOLE X-RAY RADIATION DETECTOR SYSTEMS AND METHODS

BACKGROUND

The present disclosure relates to electrically operated radiation generators and, more particularly, to monitoring and/or controlling operation of an electrically operate radiation generator.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Generally, an electrically operated radiation generator, such as an X-ray generator, a gamma ray generator, or a neutron generator, may generate radiation using electrical power on-demand to facilitate determining characteristics of its surrounding environment. Thus, electrically operated radiation generators may be used in various contexts, such as a downhole tool or for material analysis. For example, in a downhole tool, an electrically operated radiation generator may facilitate determining porosity of surrounding formations based at least in part on radiation count and/or mineralogy of surrounding formations based at least in part on a radiation spectrum.

To facilitate determining the characteristics, the electrically operated radiation generator may output high energy radiation into its surrounding environment. Once output, the high energy radiation may interact with atoms in the surroundings, for example. This interaction may be scattering of the radiation off of electrons in the atoms or off the atomic nuclei. The interaction may also include transferring energy to a nucleus or inducing nuclear reactions, which may result in the release of gamma rays, charged particles and/or neutrons. In some instances, relationship between radiation output from the electrically operated radiation generator and radiation received from the surrounding environment may be indicative of characteristics of the surrounding environment.

Additionally, in some instances, characteristics of radiation output from an electrically operated radiation generator may be indicative of the operation of the electrically operated radiation generator and, thus, used to control operation. However, in some instances, accurately determining characteristics of radiation output from an electrically operated radiation generator may be difficult, for example, due to space constraints, high temperatures, and/or high radiation flux.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

A first embodiment describes a downhole tool that includes an X-ray generator that outputs X-ray radiation into a surrounding sub-surface formation using electrical power received from a power supply and a detector device adjacent the X-ray generator. The detector device includes a first detector with a first radiation sensitivity that outputs a first measurement signal based on interaction between a first portion of the X-ray radiation and the first detector. The detector device also includes a second detector with a second radiation sensitivity adjacent the first detector, where the second detector outputs a second measurement signal based on interaction between a second portion of the X-ray radiation and the second detector. Further, the detector device includes a control system communicatively coupled to the X-ray generator and the detector device, where the control system determines characteristics of the X-ray radiation output from the X-ray generator based at least in part on a radiation model that describes expected relationship between the characteristics of the X-ray radiation and doses indicated by the first measurement signal and the second measurement signal.

Another embodiment describes a method for operating a downhole X-ray generator. The method includes generating, using the X-ray generator, X-ray radiation output into a surrounding sub-surface formation using electrical power received from a power supply; determining, using a first detector with a first radiation sensitivity, a first radiation dose rate resulting from interaction between a first portion of the X-ray radiation and the first detector; determining, using a second detector with a second radiation sensitivity adjacent the first detector, a second radiation dose rate resulting from interaction between a second portion of the X-ray radiation and the second detector; determining, using a control system, characteristics of the X-ray radiation output from the X-ray generator based at least in part on the first radiation dose rate and the second radiation dose rate; and controlling, using the control system, operation of the X-ray generator based at least in part on the characteristics of the X-ray radiation output from the X-ray generator.

Another embodiment describes a method of manufacturing a detector device to be used to in a downhole tool. The method includes segmenting a radiation detector to form a first detector and a second detector, forming a first shielding member over the first detector with a first thickness, density, and effective atomic number such that the first detector has a first radiation sensitivity to X-ray radiation received from an X-ray generator, and forming a second shielding member over the second detector with a second thickness, density, and effective atomic number, at least one of which is different from the first thickness, density and effective atomic number of the first detector such that the second detector has a second radiation sensitivity to the X-ray radiation received from the X-ray generator.

BRIEF DESCRIPTION OF THE DRAWINGS

Various aspects of this disclosure may be better understood upon reading the following detailed description and upon reference to the drawings in which.

DETAILED DESCRIPTION

Figure 1:
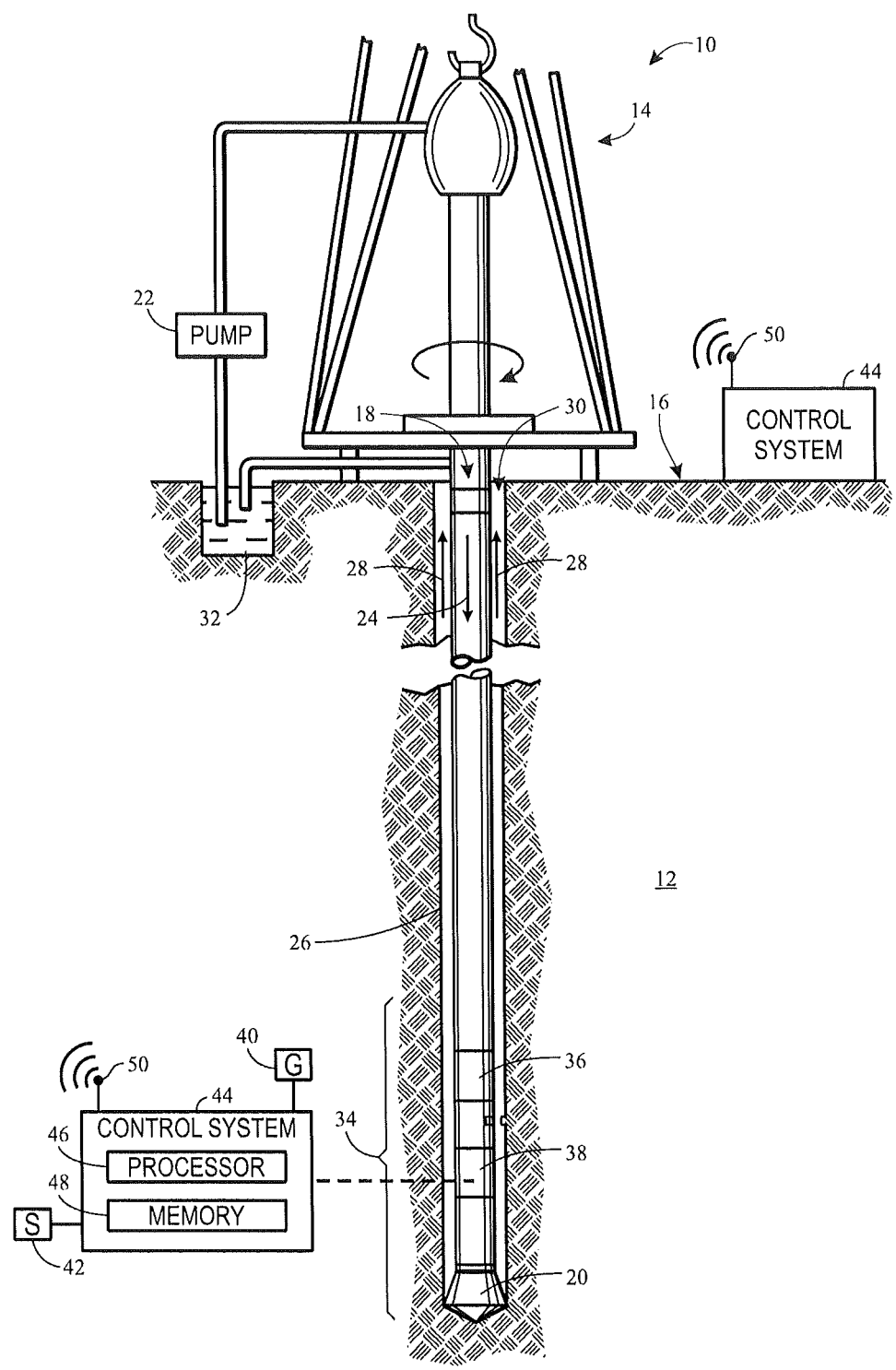
FIG. 1 is a schematic diagram of a drilling system including a downhole tool with a radiation generator, in accordance with an embodiment.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electrically operated radiation generator may generate and output radiation to facilitate determining characteristics (e.g., porosity and/or mineralogy) of its surrounding environment. Depending on characteristics to determine, various types of electrically operated radiation generators may be used, such as an X-ray generator, a gamma ray generator, or a neutron generator. Generally, the different types of electrically operated radiation generators may output different types of radiation. For example, an X-ray generator may output X-ray radiation, a gamma ray generator may output gamma ray radiation, and a neutron generator may output neutron radiation.

To generate radiation, electrical power may be supplied to accelerate a particle (e.g., ion or electron) toward a target. When the particle strikes atoms in the target, radiation may be generated and output. The emitted radiation may interact with the electrons or the nuclei of the atoms in the surrounding environment. The radiation may be scattered by the electrons or nuclei, induce nuclei to get into an excited state and/or lead to a nuclear reaction resulting in the emission of charged particles or neutrons. A detector device (e.g., sensor) may then determine count (e.g., amount), count rate (e.g., amount per unit time) and/or other characteristics of the radiation returned from the surrounding environment. In this manner, characteristics of the surrounding environment, such as porosity and/or mineralogy, may be determined based at least in part on characteristics of radiation received from the surrounding environment and characteristics of radiation output to the surrounding environment. Additionally, in some instances, operation of the radiation generator may be controlled based at least in part on characteristics of output radiation.

In some instances, a scintillation detector may be implemented to determine characteristics of X-ray radiation, for example, by recording an X-ray energy spectrum. However, available space in a downhole tool limits the ability to use scintillation detectors in a downhole setting. In particular, a downhole tool may be relatively narrow and a scintillator detector may generally be larger than other types of radiation detectors, such as solid-state detectors and/or ion chamber detectors. Scintillation detectors may have significant length and the required axial or radial room may not be available and/or may be occupied by other sensors. However, in some cases, it may be advantageous to use such detectors.

Moreover, temperature downhole may affect detector device accuracy. For example, unsteady temperatures (e.g., temperatures that vary with time) may result in a scintillation detector device losing a fraction of its light output if the temperature rises, changing the gain of the detector device, and/or the detector device outputting dark current that increases exponentially with temperature and affects the signal to noise ratio. Additionally, in some instances, a detector device may not be capable of collecting data quickly enough, providing desired energy resolution, and/or providing desired spatial resolution. Accordingly, the present disclosure provides techniques to facilitate improving accuracy of X-ray characteristic determination and, thus, accuracy of surrounding formation characteristics determined based on the X-ray characteristics and/or operation of the radiation generator in a downhole setting controlled based on the X-ray characteristics.

To help illustrate, a drilling system 10, which may be used to drill a well through subsurface formations 12, is shown in FIG. 1. In the depicted embodiment, a drilling rig 14 at the surface 16 may rotate a drill string 18, which includes a drill bit 20 at its lower end to engage the subsurface formations 12. To cool and/or lubricate the drill bit 20, a drilling fluid pump 22 may pump drilling fluid, commonly referred to as "mud" or "drilling mud," downward through the center of the drill string 18 in the direction of the arrow 24 to the drill bit 20. At the drill bit 20, the drilling fluid may then exit the drill string 18 through ports (not shown). The drilling fluid may then flow in the direction of the arrows 28 through an annulus 30 between the drill string 18 and the formation 12 toward the surface 16. In this manner, the drilling fluid may carry drill cuttings away from the bottom of a borehole 26. Once at the surface 16, the returned drilling fluid may be filtered and conveyed back to a mud pit 32 for reuse.

Additionally, as depicted, the lower end of the drill string 18 includes a bottom-hole assembly 34 that includes the drill bit 20 along with various downhole tools, such as a measuring-while-drilling (MWD) tool 36 and a logging-while-drilling (LWD) tool 38. Generally, the downhole tools (e.g., MWD tool 36 and LWD tool 38) may facilitate determining characteristics of the surrounding formation 12. Thus, in some embodiments, the LWD tool 38 may include a radiation generator 40, which outputs radiation into the surrounding formation 12, and one or more radiation detectors 42, which may measure radiation returned from the surrounding formation 12 and/or radiation output from the radiation generator 40.

In some embodiments, a control system 44 may control operation of the LWD tool 38. For example, the control system 44 may instruct the radiation generator 40 when to output radiation, instruct the radiation generator 40 when to cease outputting radiation, receive measurements from the radiation detectors 42, process the measurements to determine characteristics of the surrounding environment (e.g., formation 12), process the measurements to monitor operation of the radiation generator 40, and/or process the measurements to control operation of the radiation generator 40. In some embodiments, the control system 44 may be included in the LWD tool 38. In other embodiments, the control system 44 may be separate from the LWD tool 38, for example, in another downhole tool or at the surface 16. In other embodiments, a portion of the control system 44 may be included in the LWD tool 38 and another portion may be located separate from the LWD tool 38.

When at least a portion is separate from the LWD tool 38, information (e.g., measurements and/or determined characteristics) may be transmitted to and/or within the control system 44 for further processing, for example, via mud pulse telemetry system (not shown) and/or a wireless communication system (not shown). Accordingly, in some embodiments, the LWD tool 38 and/or the control system 44 may include wireless transceivers 50 to facilitate communicating information.

To facilitate controlling operation, the control system 44 may include one or more processors 46 and one or more memory 48. In some embodiments, the processor 46 may include one or more general purpose microprocessors, one or more application specific processors (ASICs), one or more field programmable logic arrays (FPGAs), or any combination thereof. Additionally, the memory 48 may be a tangible, non-transitory, computer-readable medium that stores instructions executable by and data to be processed by the processor 46. Thus, in some embodiments, the memory 48 may include random access memory (RAM), read only memory (ROM), rewritable flash memory, hard drives, optical discs, and the like.

Figure 2:
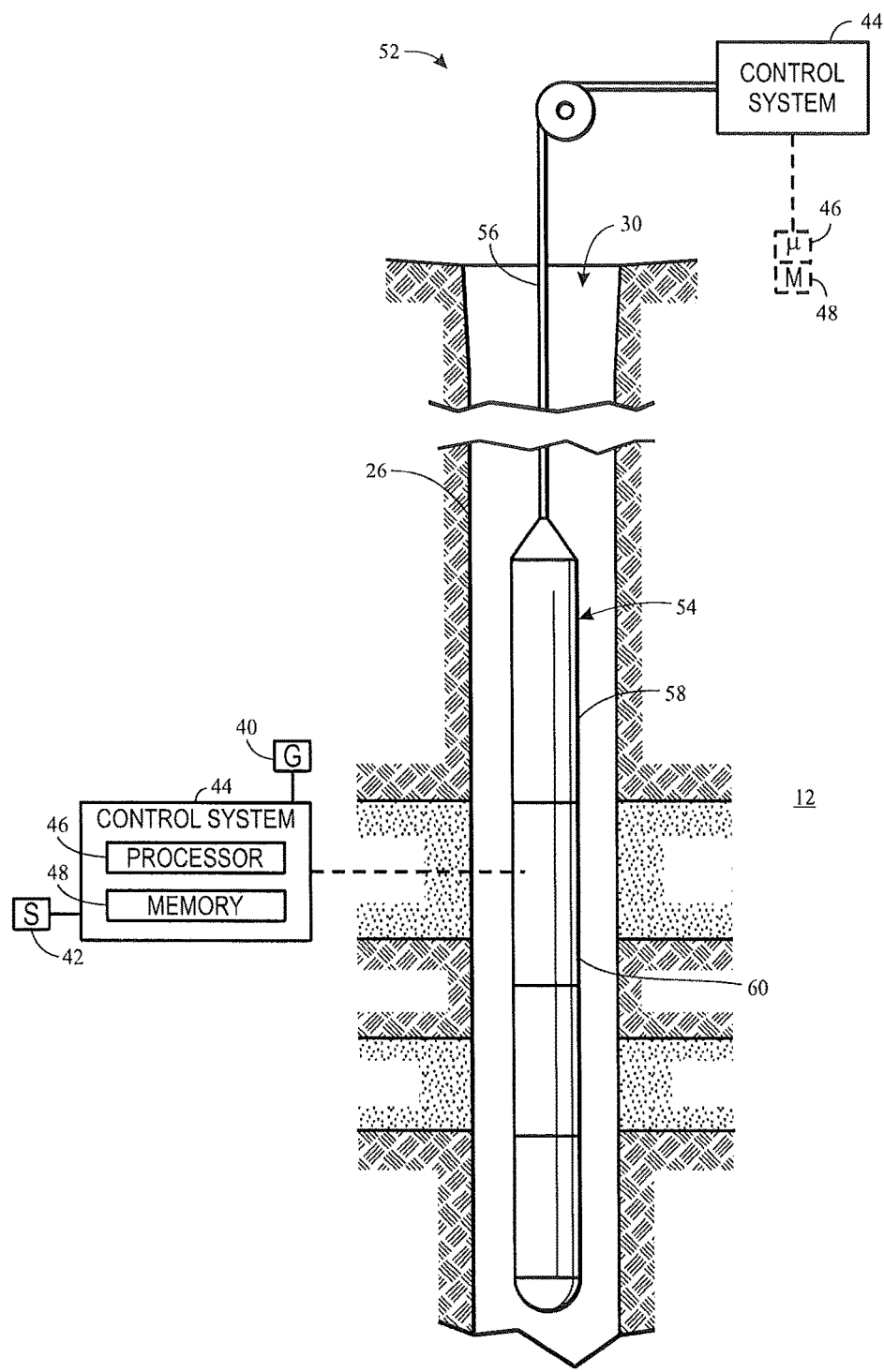
FIG. 2 is a schematic diagram of a wireline system including a downhole tool with a radiation generator, in accordance with an embodiment.

In addition to the LWD tool 38, a radiation generator 40 may be used in a wireline system 52, as shown in FIG. 2. In the depicted embodiment, the wireline system 52 includes a wireline assembly 54 (e.g., tool string) suspended in the borehole 26 and coupled to at least a portion of the control system 44 via a cable 56. Similar to the bottom-hole assembly 34, the wireline assembly 54 may include various downhole tools. For example, in the depicted embodiment, the wireline assembly 54 includes a telemetry tool 58 and a tool equipped with a radiation generator.

In some embodiments, the downhole tool 60 (e.g., nuclear tool, generator equipped logging tool, etc.) may take measurements and communicate the measurements via the telemetry tool 58 to determine characteristics of the surrounding formation 12. Thus, in some embodiments, the downhole tool 60 may include a radiation generator 40, which outputs radiation into the surrounding formation 12, and one or more radiation detectors 42, which may measure radiation returned from the surrounding formation 12 and/or radiation output from the radiation generator 40.

Similar to the LWD tool 38, a control system 44 may control operation of the downhole tool 60. In some embodiments, the control system 44 may be included in the downhole tool 60. In other embodiments, the control system 44 may be separate from the downhole tool 60 (e.g., nuclear tool), for example, in another downhole tool or at the surface 16. In other embodiments, a portion of the control system 44 may be included in the downhole tool 60 (e.g., nuclear tool) and another portion may be located separate from the downhole tool 60 (e.g., formation testing tool).

To facilitate controlling operation, the control system 44 may include one or more processors 46 and one or more memory 48. In some embodiments, the processor 46 may include one or more general purpose microprocessors, one or more application specific processors (ASICs), one or more field programmable logic arrays (FPGAs), or any combination thereof. Additionally, the memory 48 may be a tangible, non-transitory, computer-readable medium that stores instructions executable by and data to be processed by the processor 46. Thus, in some embodiments, the memory 48 may include random access memory (RAM), read only memory (ROM), rewritable flash memory, hard drives, optical discs, and the like.

Although described in relation to a drilling system 10 and a wireline system 52, radiation generators 40 may also be used in other implementations of downhole tools. For example, a radiation generator 40 may be used in a coiled tubing system, a wired drill pipe system, a slick line system, or the like. Although implementation may vary, operation of a radiation generator 40 may be generally similar in a downhole tool.

As described above and in more detail in FIG. 3, one or more radiation detectors 42 may measure characteristics of radiation output from the radiation generator 40 to facilitate determining characteristics of the surrounding formation 12 and/or the radiation generator 40. To facilitate determining characteristics of radiation output from the radiation generator 40, in some embodiments, one or more radiation detectors 42 may be included in a detector device 90 proximate the radiation generator 40.

Figure 3:
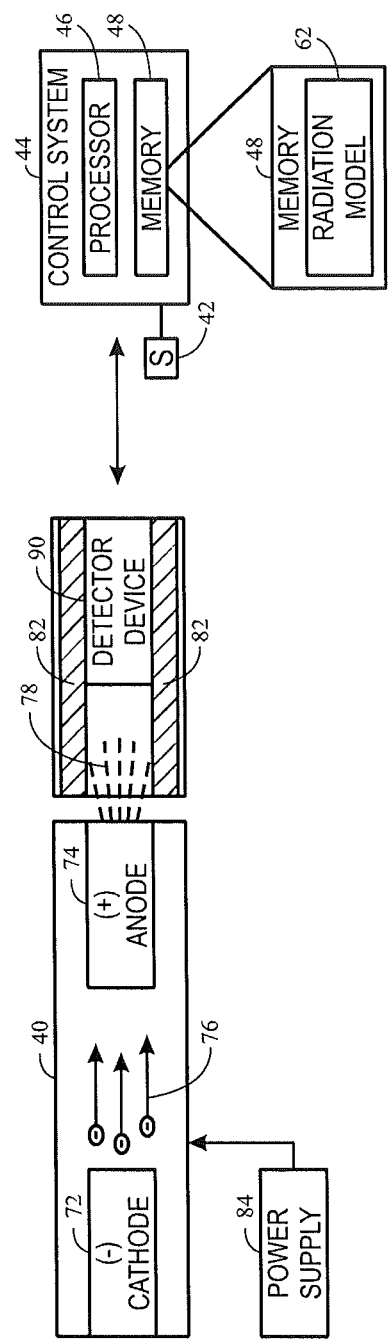
FIG. 3 is a block diagram of a radiation generator and a detector device, in accordance with an embodiment.

To help illustrate, one embodiment of a radiation generator 40 and a detector device 90 is shown in FIG. 3. In the depicted embodiment, the radiation generator 40 includes a cathode 72 and an anode 74 (e.g., target). In operation, the radiation generator 40 may generate radiation 78 using electrical power received from a power supply 84. In some embodiments, supplying electrical power to the radiation generator 40 may result in a voltage difference between the cathode 72 and the anode 74, which produces an electrical field that accelerates electrons 76 from the cathode 72 to the anode 74. As the electrons 76 impinge on the anode 74, energy may be released in the form of X-ray radiation.

In some embodiments, the detector device 90 may be adapted to fit into narrow openings and constrained areas in the downhole tool in relative proximity to the radiation generator 40. Since located in close proximity (e.g., adjacent) to the radiation generator 40, radiation 78 output from the radiation generator 40 may interact with the detector device 90, thereby enabling the detector device 90 to determine characteristics of the radiation. As described above, the detector device 90 may include one or more radiation detectors 42. In some embodiments, a radiation detector 42 in the detector device 90 may be a solid-state detector, such as a chemical vapor deposition (CVD) diamond detector, a silicon carbide detector, or a silicon detector. Additionally or alternatively, a radiation detector 42 in the detector device 90 may be an ionization chamber detector, such as a free air chamber detector, a vented chamber detector, or a high-pressure chamber detector.

In the depicted embodiment, a radiation shield 82 is disposed around the detector device 90. In other embodiments, the detector device 90 may be positioned between multiple radiation shields 82 or along the radiation shield 82. Additionally, in some embodiments, the radiation shield 82 may be tungsten, lead, barium sulfate, depleted uranium, and/or any other suitable material formed with a suitable thickness to block radiation. In this manner, the radiation shield 82 may reduce likelihood of radiation 78 coming into contact with undesirable surfaces, such as equipment sensitive to radiation and/or living organisms. Moreover, since radiation may return from the formation 12, the radiation shield 82 may reduce likelihood of formation radiation reaching the detector device 90, thereby improving accuracy of measured radiation characteristics determined using the detector device 90. A radiation shield may also be disposed between the radiation generator 40 and the detector device 90.

To facilitate determining characteristics of radiation 78 output from the radiation generator 40, the detector device 90 may be communicatively coupled with the control system 44. In this manner, the control system 44 may receive sensor data (e.g., measurement signals) from the detector device 90. For example, in some embodiments, the detector device 90 may output electrical current with a magnitude indicative of interaction between the radiation 78 and the detector device 90.

Additionally, in some embodiments, the control system 44 may analyze/process the sensor data to determine the characteristics of the radiation 78. In some embodiments, the control system 44 may analyze/process the sensor data based at least in part on a radiation model 62, for example, stored in memory 48 of the control system 44. In some embodiments, the radiation model 62 may describe relationship between sensor data received from the detector device 90 and expected characteristics of the radiation 89 output from the radiation generator 40. Additionally, in some embodiments, the radiation model 62 may include a calibration model that facilitates correcting for erroneous sensor data.

Figure 4:
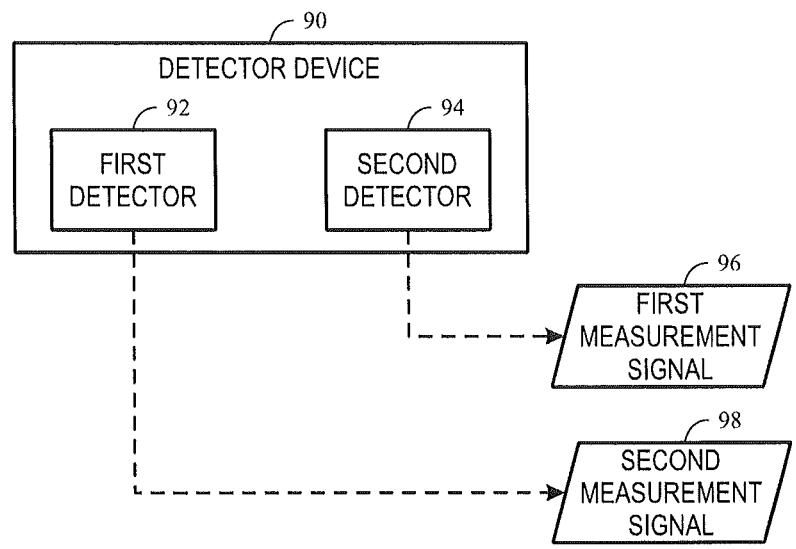
FIG. 4 is a block diagram of an example of the detector device of FIG. 3, in accordance with an embodiment.

One embodiment of a detector device 90 is shown in FIG. 4. As depicted, the detector device 90 includes a first detector 92 and a second detector 94. In some embodiments, the first detector 92 and the second detector 94 may be implemented by segmenting a radiation detector 42 to achieve a functionally and structurally analogous embodiment. In other embodiments, the first detector 92 may be implemented using a first radiation detector 42 and the second detector 94 may be implemented using a second radiation detector 42. Although two detectors are depicted, in other embodiments, the detector device 90 may include more than two detectors. For example, as will be described in more detail below, the detector device 90 may include four detectors to facilitate determining spatial characteristics of the radiation 78.

In any case, radiation that interacts a detector may induce a current output from the detector as a measurement signal. As such, measurement signal output from a detector may be indicative of radiation interaction. For example, the first detector 92 may output a first measurement signal 96 indicative of interaction between the radiation 78 output from the radiation generator 40 and the first detector 92. Additionally, the second detector 94 may output a second measurement signal 98 indicative of interaction between the radiation 78 output from the radiation generator 40 and the second detector 94.

To facilitate determining characteristics of the radiation 78 output from the radiation generator 40, in some embodiments, the first detector 92 and the second detector 94 may be implemented with differing radiation sensitivities. In some embodiments, differing radiation sensitivities may be implemented by using different types of radiation detectors 42 for the first detector 92 and the second detector 94, wherein the detectors may differ in their size and in particular in their thickness, but may also be made of a different material and may have different geometries. For example, CVD diamond may be used for one detector and cadmium-zinc-telluride (CZT) may be used for a second detector. Furthermore, the first detector may be an ionization chamber and the second detector may be a solid state detector. If two ionization detectors are used they may have different geometries, different gas composition, and/or pressure. Additionally or alternatively, differing radiation sensitivities may be implemented by providing shielding members on the first detector 92 and second detector 94 with differing thickness and/or material. In further embodiments, shielding can also be implemented by mounting one detector behind another with or without a shielding member.

Figure 5:
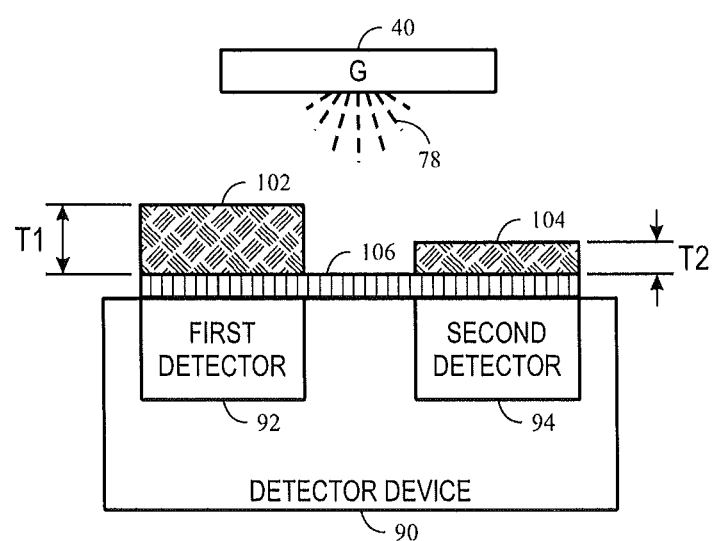
FIG. 5 is a schematic diagram of an example of the detector device of FIG. 4, in accordance with an embodiment.

To help illustrate, one embodiment of a detector device 90 implemented with differing shielding member thickness is shown in FIG. 5. As depicted, a first shielding member 102 is implemented on the first detector 92 and a second shielding member 104 is implemented on the second detector 94. Additionally, as depicted, the first shielding member 102 has a thickness T1, which is greater than the thickness T2 of the second shielding member 104. In some embodiments, the shielding members may be formed from a conductive (e.g., metallic) material. Thus, as depicted, electrical insulation 106 may be formed between the shielding members and the detectors to reduce likelihood of a short circuit.

In the depicted embodiment, once radiation generator 40 emits radiation 78, the radiation 78 traverses the shielding members. Therefore, to reach the first detector 92, the radiation 78 traverses the first shielding member 102 and insulation 106. Additionally, to reach the second detector 94, the radiation 78 traverses the second shielding material 104 and insulation 106. Thus, due to the differing thickness, density, and/or effective atomic number of the shielding members, the first detector 92 and the second detector 94 may be implemented with differing radiation sensitivities. In other embodiments, the first shielding member 102 and the second shielding member 104 may be of the same thicknesses, but may include other differing properties (e.g., material density, material attenuation, effective atomic number, etc.) that may contribute to different levels of radiation sensitivity.

In some embodiments, the current dose rate imparted on a detector may be a function of the photon flux (e.g., the number of photons that hit the surface area of the corresponding detector) and the photon energy (e.g., the energy of the photons that hit the corresponding detector). The photon end-point energy (e.g., in units of MeV) is the maximum energy produced by the photon flux. As such, having multiple detectors may facilitate determination of both the photon energy, photon flux, and/or dose rate in an X-ray generator without knowledge of the operational parameters of the X-ray generator.

Figure 6:
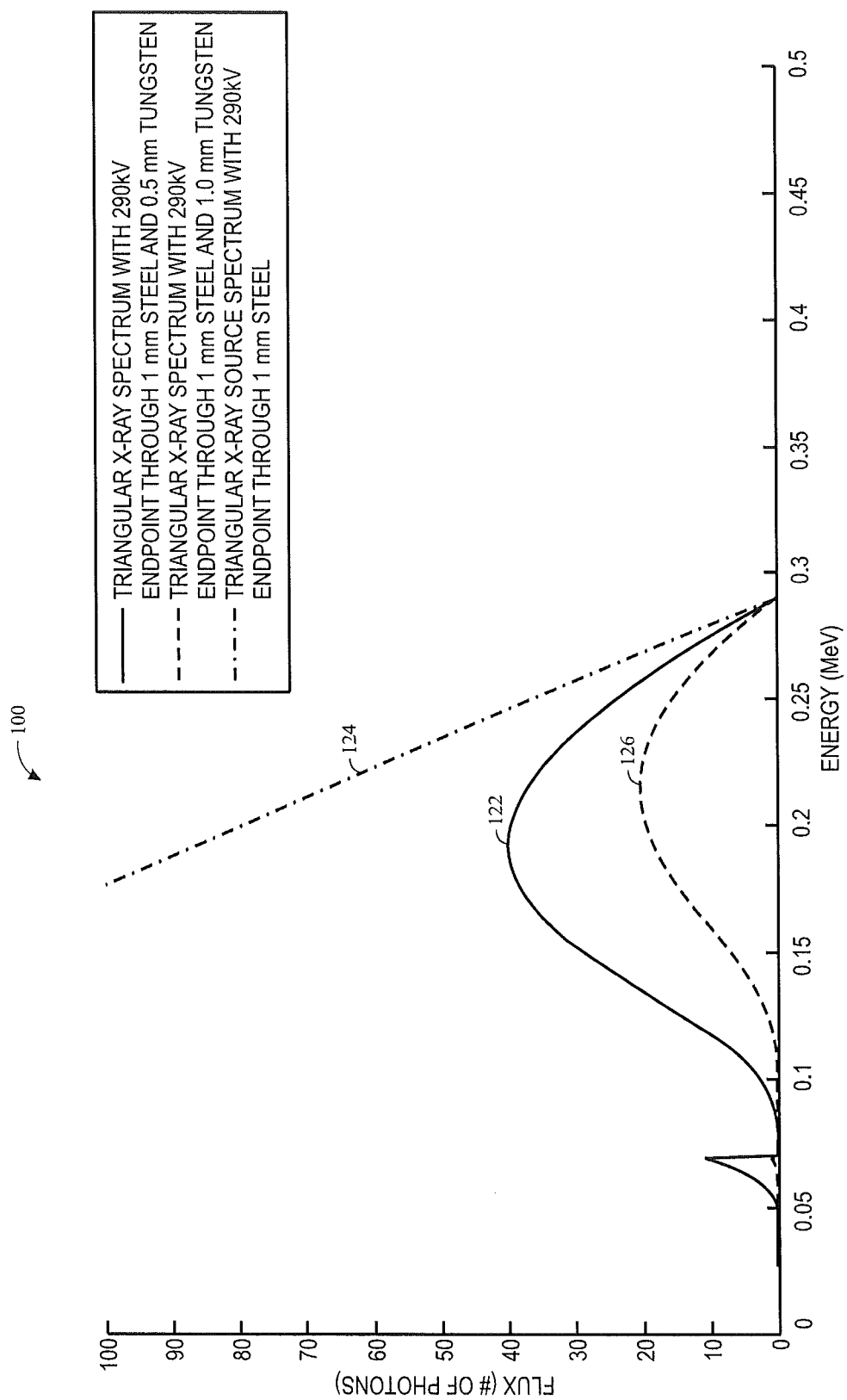
FIG. 6 is a plot of X-ray spectra received by the detector device of FIG. 4, in accordance with an embodiment.

To help illustrate this concept, FIG. 6 is a plot 120 of the X-ray spectra transmitted through various shielding members of the detector device 90. In the illustrated example, plots of the photon flux (e.g., number of photons per unit area of the detector) as a function of the photon energy (e.g., the X-ray spectra) corresponding to three different shielding members are shown. The horizontal axis displays values corresponding to energy (e.g., photon energy) and the vertical axis displays values corresponding to flux for a given photon energy (e.g., photon flux). Furthermore, all of the illustrated curves on plot 120 have a common end-point energy (e.g., 290 kV). The end point energy is the largest value of energy along the horizontal axis that the curves contain. Plot 120 has three curves that all intersect the horizontal axis at their respective end point energies (e.g., all at 290 kV).

In more detail, curve 122 is a curve of the photon flux as a function of the photon energy for a detector with a shielding member of a first material composition (e.g., tungsten, etc.) having a first thickness (e.g., 0.5 mm). The curve 126 is a curve of the photon flux as a function of the photon energy for a detector with a shielding member of a similar first material composition (e.g., tungsten, etc.) having a second thickness (e.g., 1.0 mm). The curve 124 is a curve of the photon flux as a function of the photon energy for a detector with a shielding material of a second material composition (e.g., steel, etc.) having the second thickness (e.g., 1.0 mm). A change in the photon flux without changing the endpoint energy scales the resulting spectra, and may not change the shape of the curves.

Figure 7:
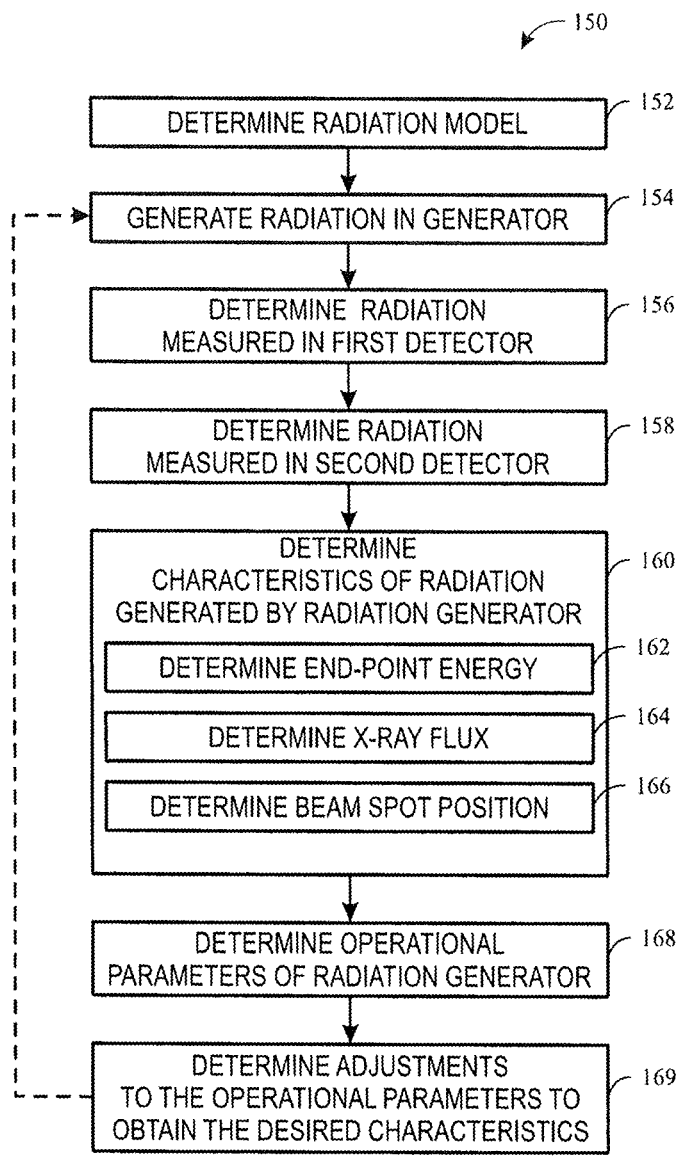
FIG. 7 is a flow diagram of a process for determining operational parameters of the radiation generator of FIG. 3, in accordance with an embodiment.

To provide context for the method whereby the operational parameters of the radiation generator are determined, FIG. 7 is a process flow diagram illustrating a process 150 for determining the operational parameters of the radiation generator. More specifically, during the process 150, the radiation model is determined (process block 152), radiation is generated by the radiation generator (process block 154), measured radiation is determined by a first detector (process block 156), measured radiation is determined by a second detector (process block 158), the characteristics of the radiation generator output are determined (process block 160), where determining such outputs includes determining the end-point energy (process block 162), determining the X-ray flux (process block 164), and determining the beam spot and/or position (process block 166). Process 150 determines the operational parameters of the radiation generator (process block 168). Based on this, adjustments to the operational parameters may be determined to obtain the desired characteristics (process block 169) and may adjust the generator radiation accordingly (process block 154).

Process 150 begins by determining the radiation model (process block 152). The radiation model may include establishing a relationship between the detector current, the shielding member properties (e.g., thickness, density, etc.), the photon energy, the end point energy, the photon flux, and/or other properties determined by the detector (process block 152). These relationships may be stored in the control system as a radiation model. These relationships may be linear, non-linear, and/or stored in plots. For example, the detector current may be directly related to the total radiation with a relationship stored in the radiation model.

For example, for a first detector with a first shielding member having a first set of properties (e.g., a first thickness, a first density, etc.), a current measured by the first detector and the dose rate may be determined from a first relationship between the photon flux and the end point energy based on the properties of the first shielding. For a second detector with a second shielding member having a second set of properties (e.g., a second thickness, a second density, etc.), the current measured by the second detector and the dose rate may be determined from a second relationship between the photon flux and the end point energy based on the properties of the second shielding. The aforementioned relationships, among others, may be stored in the radiation model (process block 152).

Once the radiation model is determined, radiation is generated by the radiation generator (process block 154). The radiation may be generated by supplying power to the radiation generator, thereby applying an electric potential difference between the anode and cathode of the radiation generator, causing electrons to flow from the cathode to the anode. The electrons impinging on the anode will create bremsstrahlung X-rays, as well as characteristic X-rays of the anode material. The end point energy of such X-rays equals the potential difference between cathode and anode multiplied by the charge of the electron. Such end-point energy may be in the range of a small fraction of a Megaelectron volt (MeV) and up to a MeV. The radiation generated may also be confined to an area or direction by using blocking shielding members and/or any other members suitable for blocking radiation.

Once generated, the radiation may be measured by a first detector (process block 156). The radiation generated may supply the first detector with photons that penetrate the surface of the first detector. The first detector may contain a first shielding member having a first set of properties (e.g., a first thickness, and a first density) and may contain an insulating member positioned between the first detector and the first shielding. The first detector may provide an output signal that is related to the photon flux incident on its surface area, where the output signal of the first detector may be a current signal. The current signal may then be used in the radiation model of the control system.

In a similar manner, the radiation may be measured by a second detector (process block 158). The radiation generated by the radiation generator may supply the second detector with photons that penetrate the surface area of the second detector. The second detector may contain a second shielding member having a second set of properties (e.g., a second thickness, and a second density or material composition) and may contain an insulating member position between the second detector and the second shielding. The second detector may provide an output signal that is related to the photon flux incident on its surface area, wherein the output signal of the first detector may be a second current signal. The second current signal may then be used in the radiation model of the control system.

Once radiation measurements (e.g. first and second currents) are determined by the first and second detector, the output characteristics of the radiation generator are determined (process block 160) by taking the radiation measurements determined by the first and second detector and finding the output characteristics of the radiation generator. Such characteristics of the radiation generator may be any characteristics (e.g., end-point energy, X-ray flux, beam spot position, etc.) related to the radiation generated by the radiation generator. The output characteristics of the radiation generator may be determined by the control system from the relationships established by the radiation model.

More specifically, determining the outputs of the radiation generator includes determining the end-point energy (process block 162). The end-point energy may be determined from the photon flux incident upon each of the respective two detectors. The end-point energy may be a single value (e.g., with units MeV, similar to those determined in FIG. 6) and may be outputted to the control system as a measurement signal by each detector. Furthermore, the X-ray flux is determined (process block 164). The X-ray dose rate is a function of the photon flux and the photon energy, as may be stored in the radiation model. Moreover, the current or other output signal of the first detector may differ from that determined by the second detector because the detectors have shielding members with varying parameters and may have different detector characteristics that allow for different detector currents to result. In other words, the end-point energy and photon flux from the source (e.g., the radiation generator) may be calculated if the output signals from the first and second detector are determined. Furthermore, another output of the radiation generator that can be determined is the beam spot position on the anode (process block 166), similarly based on a relationship that may be stored in the radiation model in the control system. Determining the beam spot position on the anode in two axial directions may require at least three detectors. For a detection only in one axial direction, two detectors suffice.

Once the outputs of the radiation generator have been determined, the operational parameters of the radiation generator may be determined (process block 168). More specifically, the operational parameters include factors that may be modified to alter the radiation generated by the radiation generator. For example, the radiation generated by the radiation generator will vary accordingly based at least in part on the applied high voltage (e.g., potential difference) and/or the electron beam current. In another example, the temperature of the environment surrounding the radiation generator and detectors may serve as an additional parameter that will vary the radiation generated. Therefore, once the operational parameters have been determined the radiation produced by the radiation generator may be altered according to adjustments computed based on the desired operating parameters (process block 169).

Figure 8:
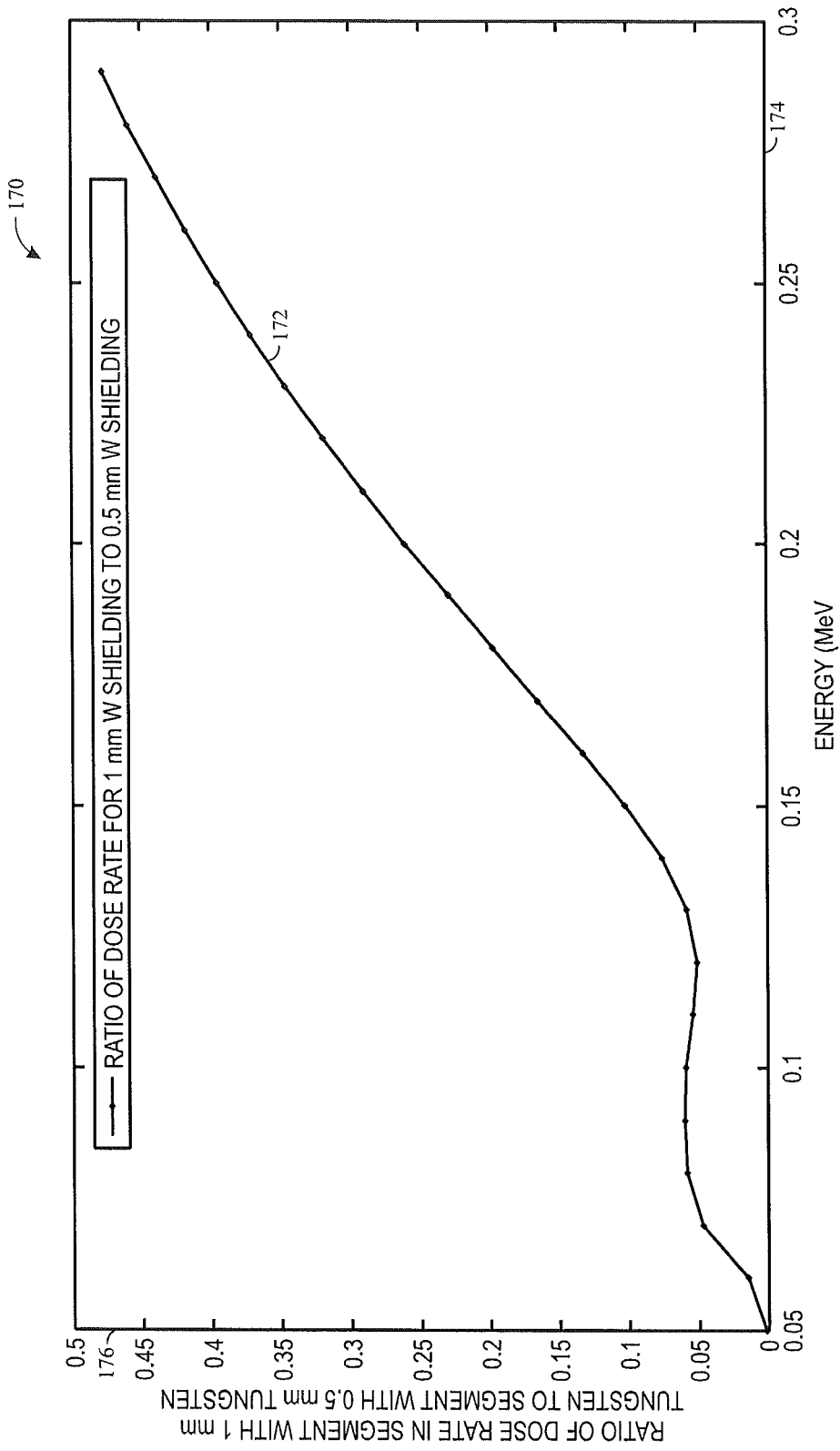
FIG. 8 is a plot of relationships used in a radiation model, in accordance with an embodiment.

FIG. 8 is a plot 170 of the ratio of the X-ray dose rates (e.g. represented by the detector currents) of two X-ray detectors with different shielding as a function of X-ray source end-point energy. As illustrated, plot 170 displays curve 172 of the ratio of the current dose rate for two detectors having shielding of varying thicknesses or materials (e.g. a first detector having a shielding member of 1 mm Tungsten and a second detector having a shielding member of 0.5 mm Tungsten). The plot 170 has a horizontal axis 174 with values of end-point energy, while the vertical axis 176 containing values for the ratio of dose rate between detector segments with different shielding members.

Furthermore, the ratio of dose rate between detector segments with different shielding members is independent of the photon flux at a given end-point energy. Since the detector current is a function of the photon flux and the photon energy, a plot similar to plot 170 of the current ratio of the dose rate between detector segments with different shielding members can be directly used to determine the end-point energy of a radiation generator. Similarly, when the photon energy is known, the total current in each of the detectors can be used to determine the X-ray flux produced by the radiation generator at a known end-point energy.

A plot of ratio of detector dose rates or detector currents and photon energy, similar to 170, may be displayed on the control system after measurements are taken (e.g., by sensors, etc.). In additional embodiments, the control system may also display the dose rate (e.g., X-ray flux) produced by the radiation generator, the photon energy produced by the radiation generator, and/or any other suitable outputs of the radiation generator.

Figure 9:
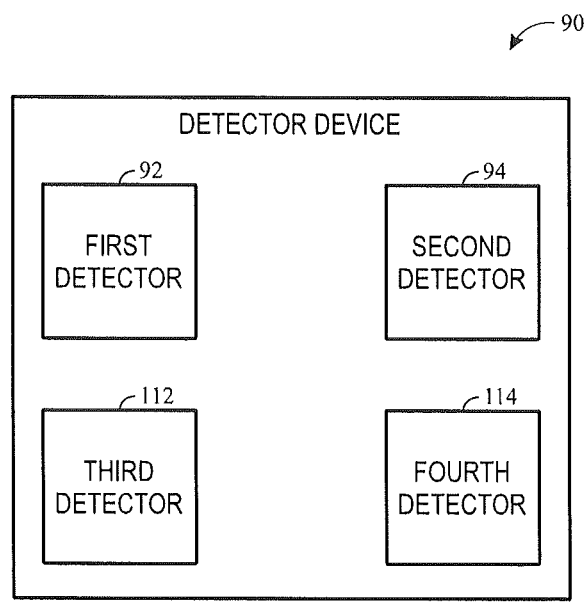
FIG. 9 is a block diagram of another example of the detector device of FIG. 3, in accordance with an embodiment.

FIG. 9 is a block diagram of a detector device 90 including four different detectors, a first detector 92, a second detector 94, a third detector 112, and a fourth detector 114. Similar to the detector device illustrated in FIG. 5, the detector device of FIG. 9 may contain detectors with shielding members of varying properties (e.g., thickness, material density, material attenuation, etc.) that may contribute to different levels of radiation shielding. For example, the first detector 92 may have a first shielding member, the second detector 94 may have a second shielding member, the third detector 112 may have a third shielding member, and the fourth detector may have a fourth shielding member, where the four shielding members may differ to allow for different levels of radiation shielding. As a result, the first detector 92, the second detector 94, the third detector 112, and the fourth detector 114 may detect different dose rates, photon fluxes, photon energies, and/or other outputs of the radiation generator.

In additional embodiments, one detector may be segmented to have four different sections that may be analogous to the detector device 90 of FIG. 9, thereby containing an analogous structure and function to the four detector arrangement of FIG. 9. Since the detector device 90 has four detectors, its longevity may be enhanced because if one detector malfunctions, the other three detectors may still provide suitable measurements. Further, the detector device 90 with its four detectors is able to determine more outputs of the radiation generator and its control detectors such as the detector gains and offsets to aid in the calibration of the operational parameters.

Figure 10:
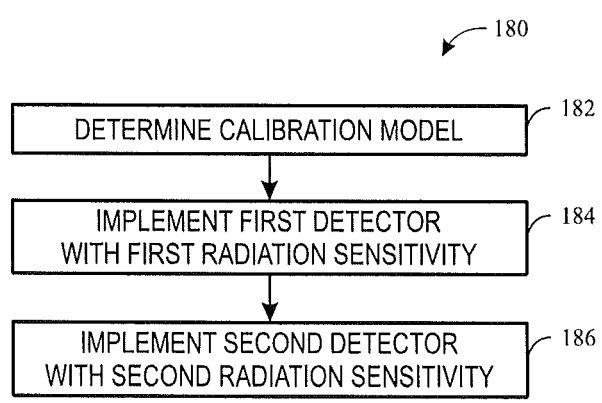
FIG. 10 is a flow diagram of a process for implementing a detector device, in accordance with an embodiment.

As a further means to illustrate the calibration method possible by using multiple detectors (e.g., four detectors on a detector device), FIG. 10 is a flow diagram 180 illustrating a process for calibrating the operational parameters. Process illustrated by flow diagram 180 determines the calibration model (process block 182), implements first detector with first radiation sensitivity (process block 184), and implement a second detector with second radiation sensitivity (process block 186).

More specifically, a calibration model may be determined (process block 182) based on outputs from the radiation generator, which may be outputted to the detector device and received by the individual detectors. Then the message signals received by the control system from the individual detectors may be stored in the radiation model to determine the calibration model. Since the measurement signals may be electrical signals, they may be subject to being noisy (e.g., because of a low dose rate, etc.) and may have a low dynamic range (e.g., because of a high dose rate). As a result, the detector response on the detector device may be altered to enhance the quality of the measurement signals used to determine the outputs of the radiation generator. Further, the calibration model may correct for any inaccuracies resulting from outputs of the radiation generator (e.g., current dose) and/or the operational parameters. The calibration model may be developed empirically, using nuclear modeling, and/or with the aid of any other methods for calculating radiation.

Once the calibration model has been developed (e.g., so as to correct for measurements high in noise, with a low dynamic range, etc.), the calibration model is used to implement the first detector response with a first radiation sensitivity (process block 184). The first radiation sensitivity on the first detector may be altered to a suitable sensitivity by modifying the properties of its corresponding shielding member so as to allow a suitable current dose from the radiation generator to traverse the shielding member of the first detector. By doing so, suitable measurement signals from the first detector may be improved to decrease noise and increase dynamic range.

Similarly, the calibration model is used to implement the second detector with a second radiation sensitivity (process block 186) based at least in part on the first radiation sensitivity on the first detector. The second radiation sensitivity on the second detector may be altered to a suitable sensitivity by modifying the properties of its corresponding shielding member so as to allow a suitable current dose from the radiation generator to traverse the shielding member of the second detector. By doing so, suitable measurement signals from the second detector may be improved to decrease noise and increase dynamic range.

In additional embodiments, the calibration model may be altered to accommodate for the implementation of more detectors with additional radiation sensitivities to allow for the calibration of additional radiation outputs (e.g., current beam rate, detector gains, detector offsets, etc.). The calibration model may be stored and implemented by the control system.

The four-detector system of FIG. 9 may be used to determine a beam position on the target (e.g., anode). In that particular case, it may be advantageous that all four detectors or at least pairs of diagonally opposed detectors are of the same construction, so that a difference in the observed signal between two detectors can be related to a change in the beam position relative to the perpendicular axis of the detector system.

While the embodiments above assume that the radiation detector may be an ionization chamber or a solid state detector. It is possible to implement the same measurements using scintillators coupled to photodetectors such as photomultipliers (PMTs), photodiodes, and the like. In addition, corrections for temperature among other corrections can be done as part of the calibration and the radiation model.

The specific embodiments described above have been shown by way of example, and it should be understood that these embodiments may be susceptible to various modifications and alternative forms. It should be further understood that the claims are not intended to be limited to the particular forms disclosed, but rather to cover any modifications, equivalents, and alternatives falling within the spirit and scope of this disclosure.

The invention claimed is:

1. A downhole tool, comprising:
an X-ray generator configured to output X-ray radiation into a surrounding sub-surface formation using electrical power received from a power supply; and
a detector device adjacent the X-ray generator, wherein the detector device comprises:
a first detector with a first radiation sensitivity configured to output a first measurement signal based on interaction between a first portion of the X-ray radiation and the first detector; and
a second detector with a second radiation sensitivity adjacent the first detector, wherein the second detector is configured to output a second measurement signal based on interaction between a second portion of the X-ray radiation and the second detector; and
a control system communicatively coupled to the X-ray generator and the detector device, wherein the control system is configured to determine characteristics of the X-ray radiation output from the X-ray generator based at least in part on a radiation model that describes expected relationship between the characteristics of the X-ray radiation and doses indicated by the first measurement signal and the second measurement signal.

2. The downhole tool of claim 1, wherein the detector device comprises:
a first shielding member formed between the X-ray generator and the first detector to produce the first radiation sensitivity, wherein the first shielding member comprises a first thickness or material; and
a second shield member formed between the X-ray generator and the second detector to produce the second radiation sensitivity, wherein the second shielding member comprises a second thickness or material different from the first thickness or material.

3. The downhole tool of claim 1, wherein:
the first detector is configured to output a first current induced in the first detector by the first portion of the X-ray radiation as the first measurement signal; and
the second detector is configured to output a second current induced in the second detector by the second portion of the X-ray radiation as the second measurement signal.

4. The downhole tool of claim 1, wherein, to determine the characteristics, the control system is configured to:
determine an expected end-point energy of the X-ray radiation based at least in part on a ratio of a first dose rate indicated by the first measurement signal and a second dose rate indicated by the second measurement signal, wherein the radiation model describes expected relationship between end-point energy of the X-ray radiation and ratios of dose rates measured by the first detector and the second detector; and
determine expected photon flux of the X-ray radiation based at least in part on the expected end-point energy.

5. The downhole tool of claim 1, wherein the control system is configured to control operation of the X-ray generator based at least in part on the characteristics.

6. The downhole tool of claim 5, wherein, to control operation of the X-ray generator, the control system is configured to:
instruct the power supply to adjust voltage difference between a cathode and an anode of the X-ray generator;
instruct the X-ray generator to adjust beam current generated by the X-ray generator; or
any combination thereof.

7. The downhole tool of claim 1, comprising a radiation detector configured to determine characteristics of radiation received from the surrounding sub-surface formation;
wherein the control system is configured to determine formation characteristics based at least in part on the characteristics of the X-ray radiation output from the X-ray generator and the characteristics of radiation received from the surrounding sub-surface formation.

8. The downhole tool of claim 1, wherein:
the detector device comprises:
a third detector adjacent the first detector, wherein the third detector is configured to output a third measurement signal based on interaction between a third portion of the X-ray radiation and the third detector and; and
a fourth detector adjacent the second detector and the third detector, wherein the fourth detector is configured to output a fourth measurement signal based on interaction between a fourth portion of the X-ray radiation and the fourth detector; and the control system is configured to determine spatial characteristics of the X-ray radiation based at least in part on a first radiation dose indicated by the first measurement signal, a second radiation dose indicated by the second measurement signal, a third dose indicated by the third measurement signal, and a fourth dose indicated by the fourth measurement signal.

9. The downhole tool of claim 1, wherein the detector device comprises a radiation detector segmented to form the first detector and the second detector.

10. The downhole tool of claim 1, wherein the first detector comprises a first radiation detector and the second detector comprises a second radiation detector.

11. The downhole tool of claim 1, wherein the detector device comprises a solid-state detector.

12. The downhole tool of claim 1, wherein the detector device comprises an ionization-chamber detector.

13. A method for operating a downhole X-ray generator, comprising:
    generating, using the X-ray generator, X-ray radiation output into a surrounding sub-surface formation using electrical power received from a power supply;
    determining, using a first detector with a first radiation sensitivity, a first radiation dose rate resulting from interaction between a first portion of the X-ray radiation and the first detector;
    determining, using a second detector with a second radiation sensitivity adjacent the first detector, a second radiation dose rate resulting from interaction between a second portion of the X-ray radiation and the second detector;
    determining, using a control system, characteristics of the X-ray radiation output from the X-ray generator based at least in part on the first radiation dose rate and the second radiation dose rate; and
    controlling, using the control system, operation of the X-ray generator based at least in part on the characteristics of the X-ray radiation output from the X-ray generator.

14. The method of claim 13, wherein determining characteristics of the X-ray radiation output from the X-ray generator comprises:
    determining expected end-point energy of the X-ray radiation using a radiation model that describes expected relationship between end-point energy and ratio of the first radiation dose rate to the second radiation dose rate; and
    determining expected photon flux of the X-ray radiation based at least in part on the expected end-point energy of the X-ray radiation.

15. The method of claim 13, comprising:
    determining, using a third detector adjacent the first detector, a third radiation dose rate resulting from interaction between a third portion of the X-ray radiation and the third detector;
    determining, using a fourth detector adjacent the second detector and the third detector, a fourth radiation dose rate resulting from interaction between a fourth portion of the X-ray radiation and the fourth detector; and
    determining, using the control system, spatial characteristics of the X-ray radiation output from the X-ray generator based at least in part on the first radiation dose rate, the second radiation dose rate, the third radiation dose rate, and the fourth radiation dose rate.

16. The method of claim 13, comprising:
    determining, using a radiation detector, characteristics of radiation received from the surrounding sub-surface formation; and
    determining, using the control system, formation characteristics based at least in part on the characteristics of the radiation received from the surrounding sub-surface formation and the characteristics of the X-ray radiation output from the X-ray generator.

17. The method of claim 13, wherein controlling operation of the X-ray generator comprises:
    instructing the power supply to adjust voltage difference between a cathode and an anode of the X-ray generator;
    instructing the generator to adjust beam current generated by the X-ray generator; or
    any combination thereof.

18. A method of manufacturing a detector device to be used in a downhole tool, comprising:
    segmenting a radiation detector to form a first detector and a second detector;
    forming a first shielding member over the first detector with a first thickness, density, and effective atomic number such that the first detector has a first radiation sensitivity to X-ray radiation received from an X-ray generator;
    forming a second shielding member over the second detector with a second thickness, density, and effective atomic number, at least one of which is different from the first thickness, density, and effective atomic number of the first detector such that the second detector has a second radiation sensitivity to the X-ray radiation received from the X-ray generator; and
    communicatively coupling a control system to the first detector and the second detector to enable the control system to determine characteristics of the X-ray radiation based at least in part on a first radiation dose measured by the first detector and a second radiation dose measured by the second detector.

19. The method of claim 18, wherein the radiation detector comprises a solid-state detector, an ionization chamber, or both.

* * * * *